United States Patent
Silletta et al.

(10) Patent No.: US 10,362,582 B2
(45) Date of Patent: Jul. 23, 2019

(54) ESTIMATING SIGNALING TRAFFIC IN MOBILE NETWORKS

(71) Applicant: TELECOM ITALIA S.p.A., Milan (IT)

(72) Inventors: Francesco Silletta, Turin (IT); Riccardo Vaglio Tessitore, Turin (IT); Renato Verduci, Rome (IT)

(73) Assignee: TELECOM ITALIA S.p.A., Milan (IT)

( * ) Notice: Subject to any disclaimer, the term of this patent is extended or adjusted under 35 U.S.C. 154(b) by 69 days.

(21) Appl. No.: 14/777,864

(22) PCT Filed: Mar. 20, 2013

(86) PCT No.: PCT/EP2013/055814
§ 371 (c)(1),
(2) Date: Sep. 17, 2015

(87) PCT Pub. No.: WO2014/146707
PCT Pub. Date: Sep. 25, 2014

(65) Prior Publication Data
US 2016/0066332 A1  Mar. 3, 2016

(51) Int. Cl.
*H04W 72/04* (2009.01)
*H04W 16/00* (2009.01)
(Continued)

(52) U.S. Cl.
CPC ........ *H04W 72/0493* (2013.01); *H04B 17/26* (2015.01); *H04B 17/309* (2015.01);
(Continued)

(58) Field of Classification Search
CPC .................................................. H04W 16/00
See application file for complete search history.

(56) References Cited

U.S. PATENT DOCUMENTS

2005/0117576 A1* 6/2005 McDysan ............. H04L 45/308
370/389
2005/0138006 A1* 6/2005 Bennett ............. G06F 17/30477
(Continued)

OTHER PUBLICATIONS

Tonesi, D. et al., "Evaluation of Signaling Loads in 3GPP Networks", IEEE Wireless Communications, vol. 14, No. 1, pp. 92-100, XP011204557, 2008.
(Continued)

*Primary Examiner* — Kevin M Cunningham
(74) *Attorney, Agent, or Firm* — Oblon, McClelland, Maier & Neustadt, L.L.P.

(57) ABSTRACT

A method upgrading a core section of a packet switched mobile network, includes: a) collecting information about a maximum signaling transaction amount managed by nodes of the core section with respect to active data connection established between user equipment and the packet switched mobile network, and calculating a corresponding active users parameter based on the collected information; b) retrieving an indication of how the maximum signaling transaction amount managed by the nodes is distributed among user equipment attached to the packet switched mobile network, and calculating a corresponding activity parameter based on the retrieved indication; c) calculating a forecasted number of user equipment which potentially can attach to the network in a future predetermined period; d) calculating a signaling traffic estimation based on the active users parameter, the activity parameter, and the forecasted number of user equipment, e) setting up the core section based on the calculated signaling traffic estimation.

10 Claims, 4 Drawing Sheets

(51) Int. Cl.
  *H04B 17/26* (2015.01)
  *H04B 17/309* (2015.01)
  *H04W 24/10* (2009.01)
  *H04W 76/14* (2018.01)
  *H04W 24/04* (2009.01)

(52) U.S. Cl.
  CPC .......... *H04W 16/00* (2013.01); *H04W 24/10* (2013.01); *H04W 76/14* (2018.02); *H04W 24/04* (2013.01)

(56) References Cited

U.S. PATENT DOCUMENTS

| | | | | |
|---|---|---|---|---|
| 2005/0165925 A1* | 7/2005 | Dan | ...................... | G06F 9/5083 709/224 |
| 2005/0237942 A1* | 10/2005 | Lewis | .................. | H04L 1/1671 370/241 |
| 2009/0106064 A1* | 4/2009 | Egner | ................... | G06Q 10/063 705/7.12 |
| 2011/0238428 A1* | 9/2011 | Kawamoto | ............ | G06Q 40/02 705/1.1 |
| 2011/0314145 A1* | 12/2011 | Raleigh | ............... | H04L 41/0893 709/224 |
| 2012/0075995 A1* | 3/2012 | Welin | ..................... | H04L 12/12 370/235 |
| 2012/0142360 A1 | 6/2012 | Puthenpura et al. | | |
| 2012/0307662 A1* | 12/2012 | Puolakka | .............. | H04W 24/02 370/252 |
| 2013/0109398 A1 | 5/2013 | Puthenpura et al. | | |

OTHER PUBLICATIONS

Alsaih, A. et al., "Next Generation Network Design and Capacity Dimensioning", Educational and Network Technology (ICENT), pp. 561-566, XP031720155, 2010.

Xiao, J. et al, "A Flow-based Traffic Model for SIP Messages in IMS", Global Telecommunications Conference, GLOBECOM, (7 pages), XP031646332, 2009.

Rahman, M. et al., "Performance Evaluation of LTE EPC Self-Healing Solutions", GLOBECOM Workshops (GC WKSHPS), pp. 813-817, XP032341480, 2012.

* cited by examiner

ESTIMATING SIGNALING TRAFFIC IN MOBILE NETWORKS

BACKGROUND OF THE INVENTION

Field of the Invention

The present invention relates to the field of wireless communications networks. Particularly, the present invention relates to a method for updating packet-switched mobile networks.

Description of the Related Art

Presently, packet-switched mobile networks, such as networks complying with the 2G/3G and LTE (Long-Term evolution) standards, are seeing an increase in terms of number of new users and data throughput requirements. The ever increasing availability of new advanced user equipment, such as smartphones and tablets, has made available to the end users a huge number of client applications, many of them causing a frequent transmission and reception of data.

This involves that packet-switched mobile networks should manage an ever increasing amount of signaling information. As it is known to those skilled in the art, with signaling information (or simply "signaling") it is intended the information exchanged among user equipment and nodes of the packet-switched mobile networks to ensure that user equipment are correctly linked to the packet-switched mobile network. Signaling information concerns establishment, control and managing of the connection between a user equipment and the network, in contrast to user information, which concerns the actual content data exchanged between the user equipment and the network based on the specific type of service requested by the user equipment.

The signaling traffic increasing is caused by several factors, such as for example the "always-on" IP-connectivity required by smartphones, tablets and generally modern mobile devices, the widespread availability of applications for mobile devices ("Apps") which require very frequent periodic updates (e.g., every minute), and the growth of machine-to-machine (M2M) devices.

Compared to the previous broadband mobile networks (such as GPRS and 2G), the current 2G/3G and LTE networks have to manage a substantially higher amount of signaling traffic. In some cases the amount of signaling exchanged between a network and a user equipment may exceed the amount of user information exchanged therebetween. This may cause a signaling traffic congestion, capable of overburdening the core sections of the network.

This drawback is further exacerbated since a same user equipment may be used in a very different way from user to user, exploiting a very wide range of different applications (and thus, generating a very wide range of different signaling).

The signaling traffic issue in packet-switched mobile networks has been faced in the literature.

For example, European patent application EP 2448361 discloses a system to reduce the signaling load in a cellular network by introducing an auxiliary device which holds data packets in order to minimize connections according to a pre-determined rule.

The Ericsson description "Ericsson Packet Core Network Overview", 1/1551-HSC 113 02 Uen K, 2 Dec. 2012, provides an overview on how 2G/3G and LTE networks operate. In order to face signaling problems, this document suggests that the HW shall not exceed the 80% of CPU load capacity of the communication board available on the GGSS and PGW nodes.

The document "Addressing the App Signaling Storm—Improve Network ROI and Customer Experience" by Marc Price, CTO Americas and VP Technology, OPENET, 26 Dec. 2012, suggests to avoid signaling congestion by limiting the number of signals directly from the user equipment.

SUMMARY OF THE INVENTION

The Applicant has found that while user equipment of previous technologies offered very few functionalities, so that it was possible to design (i.e., setting the number of required nodes and/or the resources to be assigned thereto) in advance and with relative ease a mobile network capable of efficiently managing the (small) signaling traffic originated by such user equipment, the widespread diffusion of modern user equipments that may be used in a wide range of different ways (each one capable of generating a high amount of signaling) have made this a priori design very difficult. Therefore, mobile networks should be periodically upgraded, for example by adding new nodes and/or assigning additional resources thereto, so as to efficiently manage the signaling traffic increasing.

In view of the state of the art outlined in the foregoing, the Applicant has faced the problem of how to efficiently upgrade packet switched mobile networks in such a way as to avoid occurrences of signaling traffic congestions.

An aspect of the present invention relates to a method for upgrading a core section of a packet switched mobile network intended to provide packet data services to user equipment. The method includes collecting information about a maximum signaling transaction amount managed by nodes of the core section with respect to active data connection established between user equipment and the packet switched mobile network, and calculating a corresponding active users parameter based on said collected information. The method further comprises retrieving an indication of how the maximum signaling transaction amount managed by the nodes of the core section is distributed among user equipment attached to the packet switched mobile network, and calculating a corresponding activity parameter based on said retrieved indication. The method further comprises calculating a forecasted number of user equipment which potentially will be able to attach to the network in a future predetermined period, and calculating a signaling traffic estimation based on the active users parameter, the activity parameter and the forecasted number of user equipment. The method further comprising setting up the core section based on the calculated signaling traffic estimation.

According to an embodiment of the present invention said calculating the active users parameter comprises calculating the maximum signaling transaction amount based on local peaks of signaling transaction amounts occurred during a monitoring time interval.

According to an embodiment of the present invention said calculating the active users parameter comprises subdividing the monitoring time interval into a first group of first sub-intervals; subdividing each first sub-interval in a second group of m second sub-intervals, within each second group, each second sub-interval being identified by a corresponding index j, with j ranging from 1 to m, and measuring signaling transaction amounts managed by nodes during each second sub-interval of each first sub-interval. For each j from 1 to m, the method further comprises calculating a corresponding average signaling transaction amount by performing the average among the signaling transaction amounts measured for the j-th second sub-intervals of each first sub-interval. The method further comprises setting the maximum signaling transaction amount to the highest average signaling transaction amount among the average signaling transaction amounts.

According to an embodiment of the present invention, said calculating the active users parameter further comprises for each second sub-interval of each first sub-interval, measuring the number of active data connections established during said second sub-interval, and for each j from 1 to m, calculating a corresponding average number of active data connections by performing the average among the number of active data connection measured during the j-th second sub-intervals of each first sub-interval. The method further comprises setting the active users parameters to the maximum signaling transaction amount divided by the average number of active data connections corresponding to the second sub-intervals in each first sub-interval corresponding to the highest average signaling transaction amount.

According to an embodiment of the present invention, said calculating the activity parameter comprises measuring the number of user equipment attached to the packet switched mobile network during the second sub-intervals in each first sub-interval corresponding to the highest average signaling transaction amount, and dividing said average number of active data connections corresponding to the second sub-intervals in each first sub-interval corresponding to the highest average signaling transaction amount by said measured number of user equipment attached to the packet switched mobile network.

According to an embodiment of the present invention said calculating the signaling traffic estimation comprises multiplying the active users parameter, the activity parameter, and the forecasted number of user equipment to each other.

According to an embodiment of the present invention, said setting up the core section comprises increasing the signaling capacity of the core section if the signaling traffic parameter is higher than a threshold.

According to an embodiment of the present invention said increasing the signaling capacity of the core section includes at least one among adding nodes to the core section, and increasing the resources to be assigned to the nodes of the core section.

According to an embodiment of the present invention said setting up the core section further comprises re-allocating resources previously assigned to nodes of the core section if the signaling traffic parameter is lower than the threshold.

According to an embodiment of the present invention the packet switched mobile network complies with the 2G and 3G standards.

According to an embodiment of the present invention, the packet switched mobile network complies with the LTE standard.

BRIEF DESCRIPTION OF THE DRAWINGS

These and other features and advantages of the present invention will be made evident by the following description of some exemplary and non-limitative embodiments thereof, to be read in conjunction with the attached drawings, wherein.

DETAILED DESCRIPTION OF EXEMPLARY EMBODIMENTS OF THE INVENTION

Figure 1A:
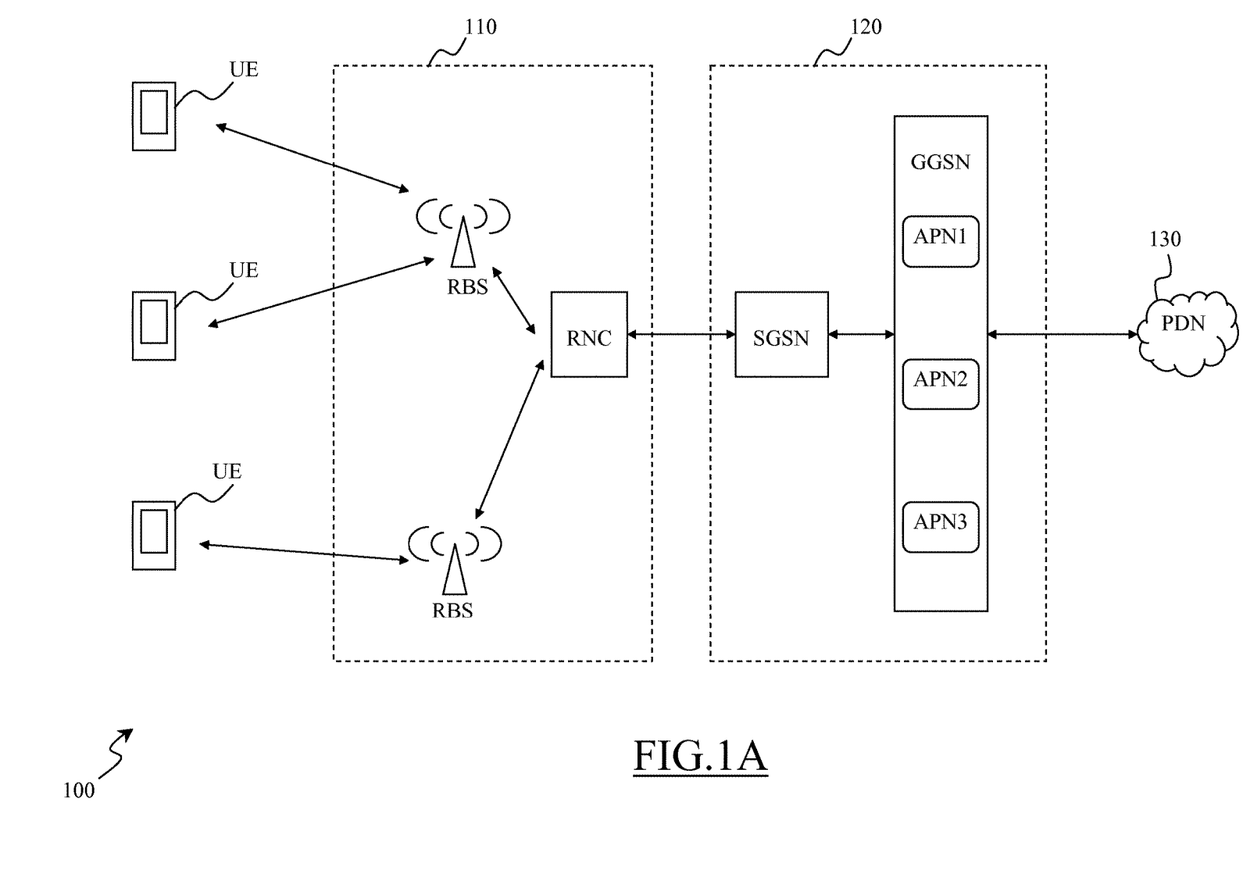
FIG. 1A schematically illustrates a packet-switched mobile network complying with the 2G and 3G standards in which solutions according to embodiments of the present invention may be applied.

With reference to the drawings, FIG. 1A schematically illustrates in terms of high-level functional blocks a packet-switched mobile network 100 (hereinafter, simply referred to as network) in which solutions according to embodiments of the present invention may be applied. The network 100 is a 2G/3G network, i.e., it complies with the 2G and 3G standards.

From a broad point of view, the network 100 comprises two main sections, i.e., a radio network section 110 and a core network section 120. The radio network section 110 is configured to set up radio links between pieces of user equipment UE (e.g., smartphones, tablets, and generally mobile communication devices) and the core network section 120. The core network section 120 is configured to provide the user equipment UE linked to the core network section 120 with packet data services, by setting up a data connection between said user equipment UE (through the radio network section) and external Packet Data Networks (PDN) 130, such as the Internet, a corporate Local Area Network (LAN), a M2M server network, an operator's service network, and so on.

The radio network section 110 comprises a plurality of Radio Base Stations RBS. Each RBS comprises radio equipment that is adapted to transmit and receive, through suitable antenna equipment, information over the radio network section 110 to enable communication with the user equipment UE located in an area (not illustrated) covered by the said RBS. The network 100 is configured in such a way that a user equipment UE is connected with one RBS at a time. Concurrent connections with more than one RBS are allowed for short periods of time for handover management. For example, each RBS may be a Base Transceiver Station (BTS) compliant with the Global System for Mobile Communications (GSM) standard or a Node-B compliant with the Universal Mobile Telecommunications System (UMTS) standard.

The RBS are connected with Radio Network Controllers RNC (only one illustrated in the figure). Each RNC serves one or a plurality of RBS, and is in charge of controlling the use and the integrity of the radio resources. It is responsible for handover decisions requiring signaling to the user terminals UE.

One or several RNC are served by a corresponding Service GPRS (General Packet Radio Service) Support Node SGSN (only one illustrated in figure) for packet data transmission. Each SGSN is a GPRS node of the core network section 120 adapted to handle the communication with the user equipment UE and the establishment of the connection between user equipment UE and the PDNs 130 via a corresponding Gateway GPRS Support Node GGSN (only one illustrated in figure). An SGSN serves all the user equipment UE physically located within a corresponding geographical service area (not illustrated). The SGSN forwards IP packets to all the pieces of user equipment UE within the service area and the corresponding GGSN. Connections between the SGSN and the user equipment UE and between the SGSN and the GGSN are handled through session management, i.e., by activating, modifying and deactivating PDP (Packet Data Protocol) contexts. In addition to the RNC, the radio network section 110 may further include Base Station Controllers (BSC) for the GSM standard.

Each GGSN forwards uplink and downlink IP packets between an SGSN and a PDN 130. A GGSN is a node of the core network section 120 adapted to generate charging information for the user equipment UE (i.e., by generating corresponding "Charging Data Records", "CDR") and to handle session management, i.e., activation, modification and deactivation of PDP contexts for sessions between the GGSN and the SGSN, and between the GGSN and the PDNs 130. Session management also includes dynamic IP address allocation and Quality of Service (QoS) negotiation.

Each GGSN may be logically partitioned with one or more Access Point Names (APN). Said partitioning is also extended to more GGSN. A user equipment UE may be connected to a GGSN under one or more APNs. The APNs identify which PDN 130 an user equipment UE is able to gain data connection with. In addition to identify a PDN, an APN may also be used to define the type of service that is provided by the identified PDN 130 (e.g., connection to a Wireless Application Protocol (WAP) server, Multimedia Messaging Service (MMS), and so on). The radio connection among user equipment UE and RBS is such as to potentially allow at least one data connection with a PDN 130 through an APN. In the considered example, the GGSN is partitioned in three different APNs, identified with references APN(1), APN(2), APN(3).

In the network 100, in order to enable a user equipment UE to exploit services provided through a PDN 130, the UE has to have performed an attach procedure, in which the SGSN is alerted that said UE has powered up, and then, once the attach procedure is completed (in this case, the UE is said to be "attached" to the network), the UE has to carry out a PDP context activation procedure for establishing an active data connection between the UE and the GGSN. The PDP context activation procedure also assigns the UE an IP address.

Figure 1B:
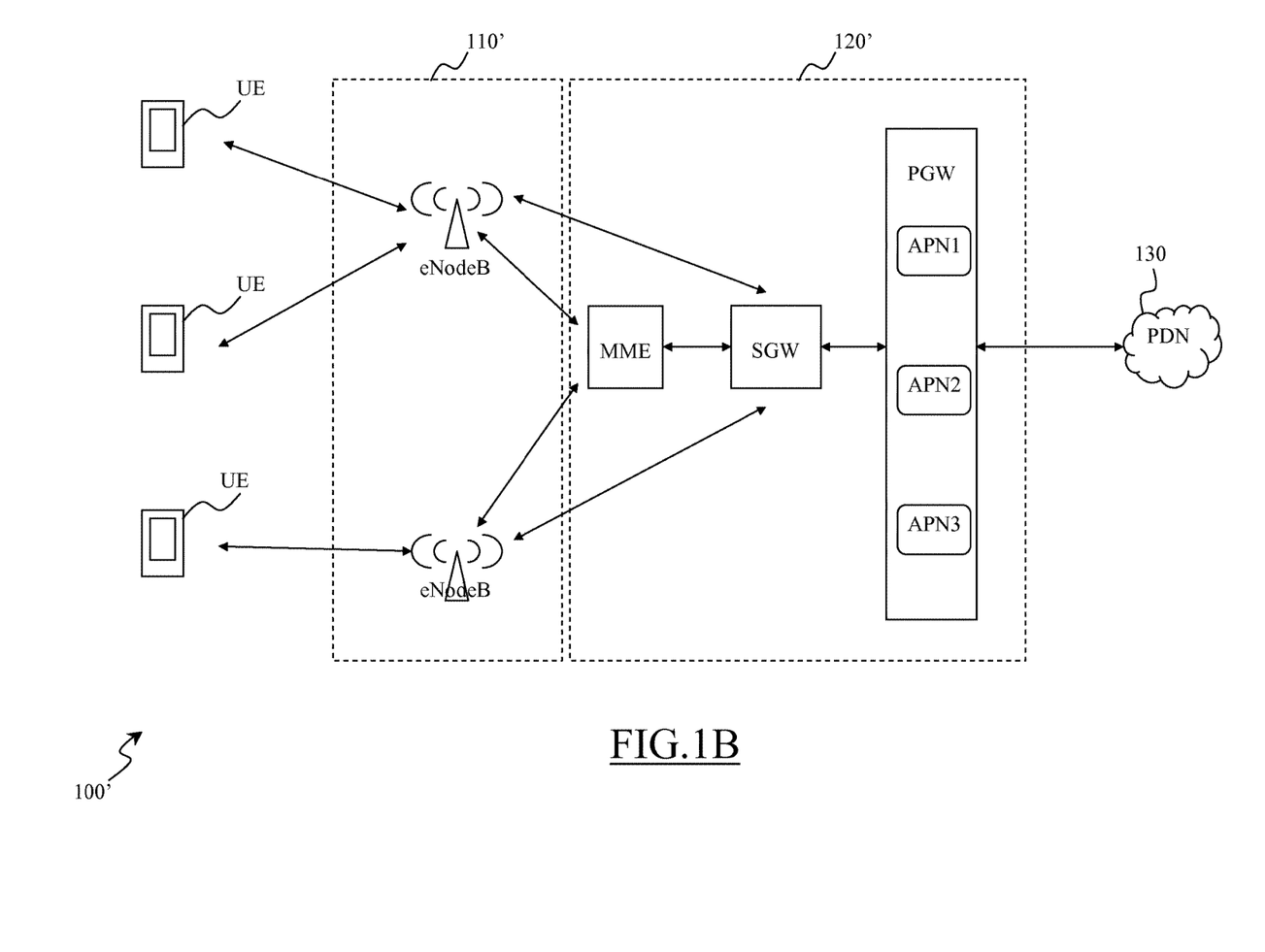
FIG. 1B schematically illustrates a packet-switched mobile network complying with the LTE standard in which solutions according to embodiments of the present invention may be applied.

FIG. 1B schematically illustrates in terms of high-level functional blocks a further packet-switched mobile network 100' in which solutions according to embodiments of the present invention may be applied. The network 100' is an LTE network, i.e., it complies with the LTE standard.

Like the network 100, the network 100' comprises two main sections, i.e., a radio network section 110' and a core network section 120'. The radio network section 110' is configured to set up radio links between user equipment UE and the core network section 120'. The core network section 120' is configured to provide the user equipment UE linked to the core network section 120' with packet data services, by setting up a data connection between said user equipment UE and PDNs 130.

The radio network section 110' comprises a plurality of Evolved Nodes B eNodeB. Each eNodeB is an enhanced base station that connects the user equipment UE located in an area (not illustrated) covered by the said eNodeB with the core network 120'. Main functionalities of the eNodeB are radio bearer control, radio admission control, connection mobility control, and dynamic resource handling.

The core network section 120' comprises a plurality of Mobile Management Entities MME (only one illustrated in the figures). The MME is a key control node of the core network 120'. The main functionalities of the MME are to attach and detach user equipment UE, authentication, choose PDN gateways PGW and Serving gateways SGW for the user equipment UE, and management of PDN 130 connections and core network section 120' bearers. The MME also handles mobility procedures, user equipment UE tracking, and paging.

The core network section 120' comprises a plurality of SGW (only one illustrated in the figures). A SGW is a node adapted to route and forward user packet data from the user equipment UE to the PGW or from the PGW to the user equipment UE. The SGW acts as a local mobility anchor for the user plane during inter-eNodeb handovers and provides charging functionality.

The PGWs are nodes of the core network section 120' acting as gateways between the core network section 120' and external PDNs 130. A PGW provides IP connectivity towards external PDNs 130, policy and admission control, and packet filtering per user. The PGW can also be used for charging. Similarly to the GGSN of network 100, each PGW may be logically partitioned with one or more APN. In the network 100', signaling traffic may occur both between eNodeB and MME, and between eNodeB and SGW.

In the network 100', in order to enable a user equipment UE to exploit services provided through a PDN 130, the UE has to have performed an attach procedure similar to that carried out in the network 100 and then, once the UE is attached to the network, the UE has to carry out an EPS bearer activation procedure for establishing an active data connection between the UE and the PGW. The UE is also assigned an IP address. Unlike network 100, where the UE can request a PDP context activation procedure at any time, in network 100' the establishment of an active data connection through the EPS bearer activation procedure is always requested at power on. This ensures that the UE is always connected to a SGW and always has an IP address.

As already mentioned above, modern packet-switched mobile networks, such as the network 100 and the network 100', have to manage a very high amount of signaling to be exchanged among the nodes of the networks. If the signaling becomes too high, signaling traffic congestions may occur, reducing the efficiency of the services provided to the user terminals UE. Thus, a modern packet-switched mobile network, such as the network 100 and the network 100', needs to be periodically upgraded, e.g., by setting the number of SGSN, GGSN, MME, SGW, PGW nodes and/or the resources (e.g., memory and processing capabilities) to be assigned thereto, in order not to overburden the core sections of the network. However, since a same user equipment UE may be used in different ways from user to user, and may run a range of different user equipment applications each one involving a different amount of signaling, upgrading a modern packet-switched mobile network is a burdensome task. If the signaling amount happens to be relatively high, and the network is upgraded with a too low number of nodes and/or by assigning thereto a too low amount of resources, signaling traffic congestions may occur. On the other hand, if the signaling amount happens to be relatively low, upgrading the network with a too high number of nodes and/or by assigning thereto a too high amount of resources may increase installation and management costs of the network in a useless way.

Figure 2:
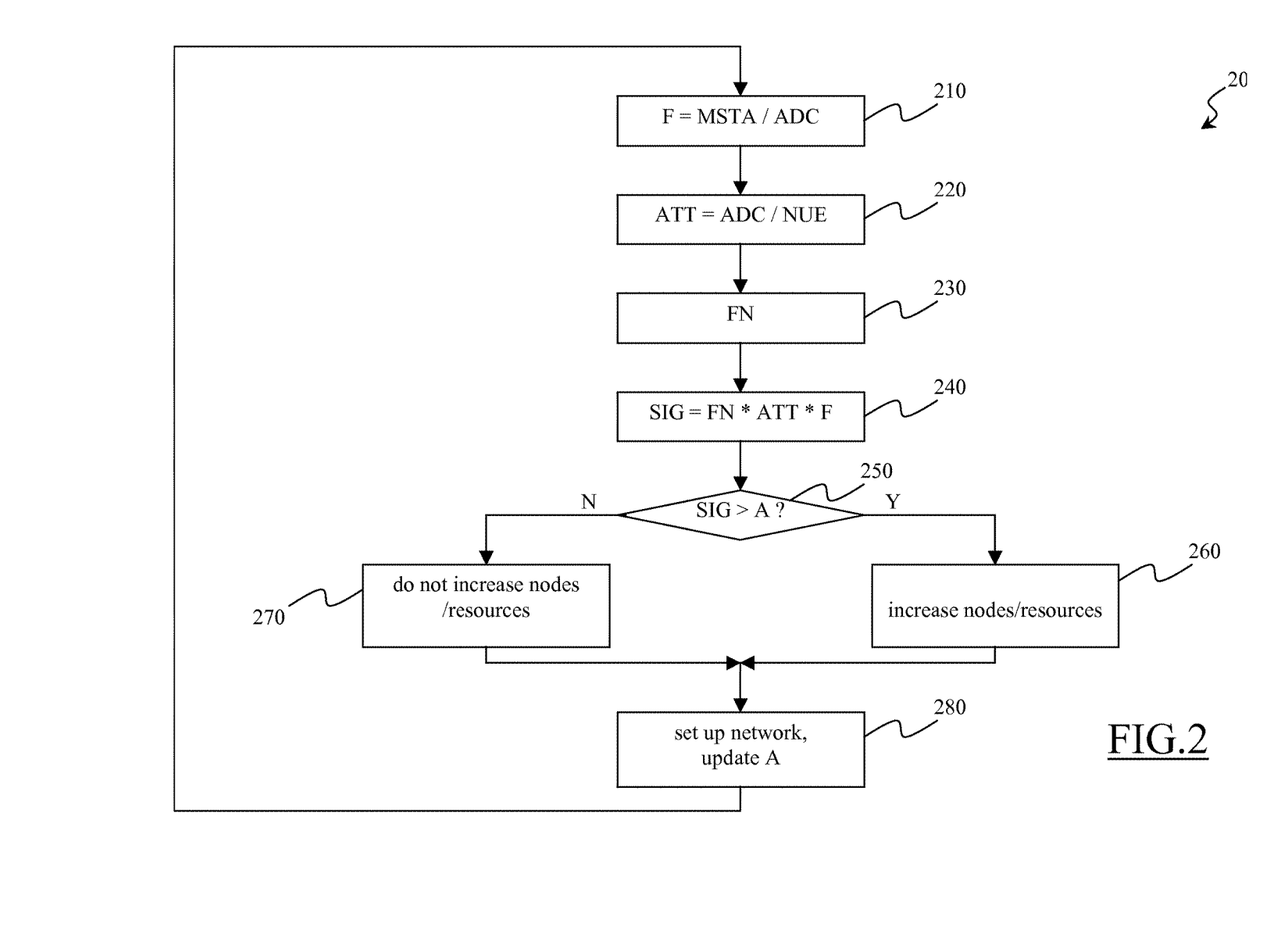
FIG. 2 illustrates in terms of functional blocks a method for planning the design of the network of FIG. 1A or FIG. 1B according to an embodiment of the present invention.

FIG. 2 illustrates in terms of functional blocks a method 200 for periodically upgrading packet-switched mobile networks, such as the networks 100 and 100'. The method 200 according to an embodiment of the present invention provides for calculating an estimation of the signaling traffic which is going to occur in the network in forthcoming time periods, and then setting the nodes and/or the resources assigned thereto based on such estimation. Hereinafter, when describing the method 200, with the generic term of "network" it is intended any packet-switched mobile network, such as the network 100 or the network 100'.

The first phase of the method 200 according to an embodiment of the present invention (block 210) provides for calculating an active users parameter F of the network. The active users parameter F of a network is a parameter which provides information about the maximum signaling transaction amount managed by the core section of the network with respect to the active data connections ADC (e.g., PDP contexts in network 100 or EPS bearers in network 100') established in the network. For this purpose, the signaling transactions amount (e.g., in terms of transactions for unity of time, such as in terms of transactions per second) carried out among nodes of the core section of the network is monitored during a predetermined monitoring time interval MTI (e.g., one or more months or one or more weeks). Then, a maximum signaling transaction amount MSTA is calculated based on local peaks of signaling transactions amounts occurred during the monitoring time interval MTI.

According to an embodiment of the present invention, the maximum signaling transaction amount MSTA is calculated in the following way:

1) The monitoring time interval MTI is subdivided into n first sub-intervals SI1(i) (i=1 to n). For example, each first sub-interval SI1(i) may correspond to a week, or a day.

2) Each first sub-interval SI1(i) is subdivided in turn into m second sub-intervals SI2(j) (j=1 to m). For example, each second sub-interval SI2(j) may correspond to a specific day of a week, a specific hour, a half hour or a quarter of an hour of a day.

3) The signaling transaction amounts in the network are measured during each second sub-interval SI2(j) of each first sub-interval SI1(i). In this way, it is possible to identify which are the periods of the monitoring time interval MTI wherein local high peaks of signaling transaction amount occurs.

4) For each j (from 1 to m), a corresponding average signaling transaction amount ASTA(j) is calculated by performing the average among the signaling transaction amounts measured for the j-th second sub-intervals SI2(j) of each first sub-interval SI1(i). The second sub-intervals SI2(j) in each first sub-interval SI1(i) corresponding to the highest average signaling transaction amount ASTA(j) are referred to as "signaling highest peak periods".

5) The maximum signaling transaction amount MSTA is set equal the average signaling transaction amount ASTA(j) corresponding to the signaling highest peak periods.

According to another embodiment of the present invention, the maximum signaling transaction amount MSTA may be directly set equal to the highest signaling transaction amount measured during the whole monitoring time interval MTI.

If the predetermined monitoring time interval MTI corresponds to a month, local high peaks of signaling transaction amounts may occur, for example, during the evening periods of the working days, and/or during the whole holiday days.

The active users parameter F of the network is then set to the maximum signaling transaction amount MSTA divided by the number of active data connections ADC (established between user equipment UE and the core section of the network) during the signaling highest peak periods.

According to an embodiment of the present invention, the number of active data connections ADC is calculated in the following way.

1) For each second sub-interval SI2(j) of each first sub-interval SI1(i), the number of active data connections AC(i,j) established during such second sub-interval SI2(j) is measured.

2) For each j (from 1 to m), a corresponding average number of active data connections AAC(j) is calculated by performing the average among the number of active data connections AC(i,j) measured during the j-th second sub-intervals SI2(j) of each first sub-interval SI1(i).

3) The number of active data connections ADC is set equal to the average number of active data connections AAC(j) corresponding to the signaling highest peak periods.

According to an embodiment of the present invention, different active users parameters F may be calculated for a same network, each one obtained by taking into account only the maximum signaling transaction amount MSTA caused by, and the active data connections ADC established with, user equipment UE configured with a specific APN APN(i). In this way, it is possible to advantageously quantify for each APN APN(i) the corresponding maximum signaling traffic amount managed by the core section of the network with respect to the active data connections ADC. According to an embodiment of the present invention, the maximum signaling transaction amount MSTA may be further deduced by information directly provided by the vendor of the network.

The next phase of method 200 according to an embodiment of the present invention (block 220) provides for calculating an activity parameter ATT of the network, defined as the ratio between:

the number of active data connections ADC established between user equipment UE and the core section of the network during the second sub-intervals SI2(j) corresponding to the signaling highest peak periods, and the number NUE of pieces of user equipment UE attached to the network during the same second sub-intervals SI2(j) corresponding to the signaling highest peak periods.

The activity parameter ATT gives an indication of how the maximum signaling transaction amount MSTA is distributed among the user equipment UE actually attached to the network. In this case as well, according to an embodiment of the present invention different activity parameters ATT may be calculated for a same network, each one obtained by taking into account only the number of user equipment UE configured with a specific APN APN(i), and only the number of active data connections ADC established with said APN APN(i).

The next phase of the method 200 according to an embodiment of the present invention (block 230) provides for forecasting the number FN of user equipment UE which potentially will be able to attach to the network in a future predetermined period (e.g., the next two-three years). According to an embodiment of the present invention, the forecasted number FN of user equipment UE is calculated by interpolating existing data relating to the diffusion of user equipment UE in preceding periods. According to another embodiment of the present invention, the forecasted number FN may be provided by Marketing, depending on the number of user equipments UE which will be available in the market in said future predetermined period. The forecasted number FN of user equipment UE may be obtained by considering a network (in this case, it corresponds to the number of all the user equipment UE of the type adapted to interface with said network) or a specific APN APN(i) (in this case, it corresponds to the number of all the user equipment UE which are configured with said APN APN(i)).

At this point (block 240), the method according to an embodiment of the present invention provides for calculating a signaling traffic estimation SIG (e.g., in terms of transactions for unity of time, such as in terms of transactions per second) which is going to occur in a forthcoming time period according to the following formula:

$$SIG=FN*ATT*F.$$

Depending on how FN, ATT and F have been calculated, the signaling traffic estimation SIG may regard the signaling traffic of an entire network (such as the 2G/3G network 100 or the LTE network 100'), or the signaling traffic involving one or more APN APN(i) (such as the APN IBox on the 2G/3G network 100, the APN Wap on the 2G/3G network 100 or the APNs IBox and Wap on the LTE network 100').

Figure 3:
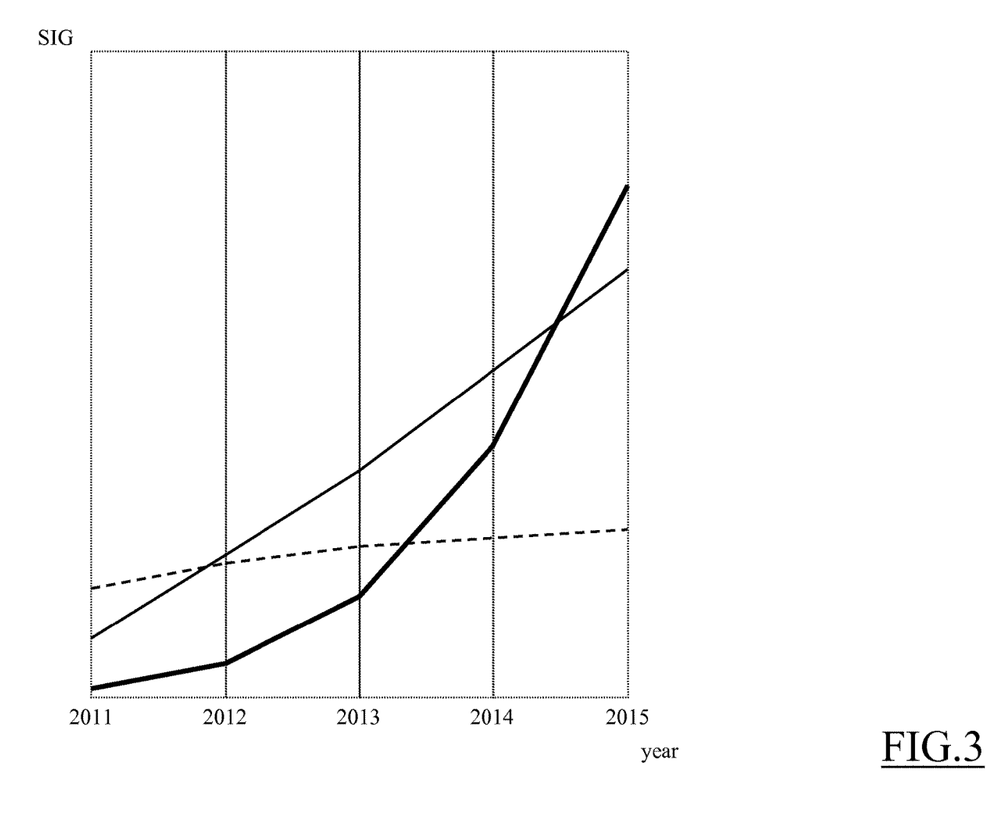
FIG. 3 illustrates an exemplary diagram showing possible signal traffic estimations calculated with the method of FIG. 2.

FIG. 3 illustrates an exemplary diagram showing possible signaling traffic estimations SIG corresponding to the APN IBox on a 2G/3G network (dotted line), to the APN Wap on a 2G/3G network (solid line), and to the APNs IBox and Wap on the LTE network (bold line), calculated according to the method 200 for a period ranging from the 2011 to the 2015.

Returning to FIG. 2, based on the previously calculated signaling traffic estimation SIG, a check is made for assessing whether more nodes should be added or not to the core section of the network and/or whether additional resources should be assigned thereto (block 250). For this purpose, according to an embodiment of the present invention, the signaling traffic SIG is compared with a maximum signaling threshold A which provides an indication of the signaling traffic (e.g., in terms of transactions for unity of time, such as in terms of transactions per second) the actual core section of the network is able to manage without being overburden by signaling traffic congestions.

If the signaling traffic estimation SIG is higher than the maximum signaling threshold A (exit branch Y of block 250), it means that the signaling capacity of the core section of the network should be increased, for example by planning the addition of more nodes and/or by increasing the resources to be assigned to the nodes (block 260). Advantageously, an action item list may be produced, for ordering resource and operating actions.

If the signaling traffic estimation SIG is lower than the maximum signaling threshold, (exit branch N of block 250), it means that the signaling capacity of the core section of the network is already sufficient to manage the estimated signaling traffic (block 270). According to an embodiment of the present invention, in this case it may be possible to plan the re-allocation of the available resources which will be otherwise wasted.

The next step of the method 200 according to an embodiment of the present invention (block 280) provides for upgrading the core section of the network by setting up it based on the results obtained in blocks 260 or 270 (for example by adding nodes and/or allocating additional resources if the signaling traffic estimation SIG has been assessed to be higher than the maximum signaling threshold A), and accordingly updating the maximum signaling threshold A based on the new signaling capacity of the core section of the network.

Then, the operations corresponding to blocks 210-280 are periodically reiterated (returning to block 210), for example every few months, using newly calculated/obtained FN, ATT, F for obtaining an updated signaling traffic estimation SIG.

The concepts of the present invention also apply in case the networks 100 operates in a Direct Tunnel (DT) modality (this is not applicable for basic 2G network), i.e., when the RNC are directly connected with the GGSN, bypassing the SGSN for the user traffic component. In this case, the GGSN has to be capable of managing the signaling traffic coming from both the SGSN and the RNC.

The previous description presents and discusses in detail several embodiments of the present invention; nevertheless, several changes to the described embodiments, as well as different invention embodiments are possible, without departing from the scope defined by the appended claims.

The invention claimed is:

1. A method for upgrading a core section of a packet switched mobile network configured to provide packet data services to user equipment, the method comprising:
    collecting information about a maximum signaling transaction amount managed by nodes of the core section, and a number of active data connections established between user equipment and the packet switched mobile network during a monitoring time interval;
    calculating an active users parameter as the maximum signaling transaction amount divided by the number of active data connections;
    retrieving information about a number of user equipment attached to the packet switched mobile network during at least a portion of the monitoring time interval;
    calculating an activity parameter from at least the number of user equipment attached to the packet switched mobile network for the at least the portion of the monitoring time interval;
    calculating a forecasted number of user equipment which potentially will be able to attach to the network in a future predetermined period;
    calculating a signaling traffic estimation by multiplying the active users parameter, the activity parameter, and the forecasted number of user equipment by each other; and
    setting up the core section based on the calculated signaling traffic estimation by increasing signaling capacity of the core section if the signaling traffic estimation is higher than a threshold.

2. The method of claim 1, wherein the calculating the active users parameter comprises calculating the maximum signaling transaction amount based on local peaks of signaling transaction amounts occurred during the monitoring time interval.

3. The method of claim 2, wherein the calculating the active users parameter comprises:
    a) subdividing the monitoring time interval into a first group of first sub-intervals;
    b) subdividing each first sub-interval into a second group of m second sub-intervals, within each second group, each second sub-interval being identified by a corresponding index j, with j ranging from 1 to m;
    c) measuring signaling transaction amounts managed by nodes during each second sub-interval of each first sub-interval;
    d) for each j from 1 to m, calculating a corresponding average signaling transaction amount by performing averaging among the signaling transaction amounts measured for the j-th second sub-intervals of each first sub-interval;
    e) setting the maximum signaling transaction amount to a highest average signaling transaction amount among the average signaling transaction amounts.

4. The method of claim 3, wherein the calculating the active users parameter further comprises:

a) for each second sub-interval of each first sub-interval, measuring a number of active data connections established during the second sub-interval; and
b) for each j from 1 to m, calculating a corresponding average number of active data connections by performing averaging among the number of active data connection measured during the j-th second sub-intervals of each first sub-interval;

wherein the number of active data connections is the average number of active data connections corresponding to the second sub-intervals in each first sub-interval corresponding to the highest average signaling transaction amount.

5. The method of claim 4, wherein the calculating the activity parameter comprises:

measuring a number of user equipment attached to the packet switched mobile network during the second sub-intervals in each first sub-interval corresponding to the highest average signaling transaction amount, and dividing:

a) the average number of active data connections corresponding to the second sub-intervals in each first sub-interval corresponding to the highest average signaling transaction amount by
b) the measured number of user equipment attached to the packet switched mobile network.

6. The method of claim 1, wherein the setting up the core section further comprises re-allocating resources previously assigned to nodes of the core section if the signaling traffic estimation is lower than the threshold.

7. The method of claim 1, wherein the packet switched mobile network complies with the 2G and 3G standards.

8. The method of claim 1, wherein the packet switched mobile network complies with the LTE standard.

9. The method of claim 1, wherein resources comprise memory and processing capabilities of the nodes.

10. The method of claim 1, wherein the signaling capacity of the core section is increased by increasing resources to be assigned to the nodes of the core section independently of a number of the nodes of the core section.

* * * * *